US012233738B2

(12) United States Patent
Chopra et al.

(10) Patent No.: US 12,233,738 B2
(45) Date of Patent: Feb. 25, 2025

(54) BATTERY PRECONDITIONING SYSTEMS AND METHODS FOR ELECTRIC-DRIVE VEHICLES

(71) Applicant: GM GLOBAL TECHNOLOGY OPERATIONS LLC, Detroit, MI (US)

(72) Inventors: Sumit Chopra, Ann Arbor, MI (US); Matthew L. Ehrenfeld, Davison, MI (US); Orlando Ward-Santos, Berkeley, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 741 days.

(21) Appl. No.: 17/515,830

(22) Filed: Nov. 1, 2021

(65) Prior Publication Data

US 2023/0137357 A1 May 4, 2023

(51) Int. Cl.
*H02J 7/00* (2006.01)
*B60L 53/62* (2019.01)
*B60L 53/66* (2019.01)
*B60L 58/12* (2019.01)
*H02J 7/14* (2006.01)

(52) U.S. Cl.
CPC ............. *B60L 53/665* (2019.02); *B60L 53/62* (2019.02); *B60L 58/12* (2019.02); *H02J 7/0048* (2020.01)

(58) Field of Classification Search
CPC ........ B60L 53/665; B60L 53/62; B60L 58/12; H02J 7/0048
USPC ........................................................ 320/134
See application file for complete search history.

(56) References Cited

U.S. PATENT DOCUMENTS

| 6,275,004 | B1 | 8/2001 | Tamai et al. |
| 7,851,085 | B2 | 12/2010 | Obrovac et al. |
| 8,565,949 | B2 | 10/2013 | Christman et al. |
| 9,028,565 | B2 | 5/2015 | Huang |

(Continued)

OTHER PUBLICATIONS

Homebmwi3news, BMW i3: How Preconditioning Works, http://insideevs.com/nws/325863/bmw-i3-how-preconditioning-works/. Sep. 30, 2021, 10 pages.

(Continued)

*Primary Examiner* — Alexis B Pacheco
(74) *Attorney, Agent, or Firm* — Quinn IP Law

(57) ABSTRACT

Presented are closed-loop feedback control systems for preconditioning batteries, methods for making/using such systems, and electric-drive vehicles with battery preconditioning capabilities. A method for operating a battery system of a motor vehicle includes a system controller receiving a recharge signal to schedule a recharge event for a battery of the vehicle. The system controller responsively derives a target preconditioning temperature for optimizing the battery recharge event, and determines the battery state of voltage or charge for at the vehicle's current location. The system controller also predicts an SOV/SOC for the battery upon arrival of the motor vehicle at a selected charging station, and estimates a preconditioning time to thermally precondition the battery to the target preconditioning temperature. The system controller then transmits one or more preconditioning signals to the thermal system to precondition the battery based at least upon the present SOV/SOC, target preconditioning temperature, and predicted battery preconditioning time.

20 Claims, 3 Drawing Sheets

(56) References Cited

U.S. PATENT DOCUMENTS

| | | |
|---|---|---|
| 9,142,830 B2 | 9/2015 | Xiao et al. |
| 9,142,980 B2 | 9/2015 | Lee |
| 9,281,514 B2 | 3/2016 | Rhodes et al. |
| 9,660,462 B2 | 5/2017 | Jeon |
| 9,923,189 B2 | 3/2018 | Xiao |
| 10,062,898 B2 | 8/2018 | Xiao |
| 10,199,643 B2 | 2/2019 | Zhou et al. |
| 10,367,201 B2 | 7/2019 | Yang et al. |
| 10,388,959 B2 | 8/2019 | Dong et al. |
| 10,424,784 B2 | 9/2019 | Yang et al. |
| 10,435,773 B2 | 10/2019 | Liu et al. |
| 10,446,884 B2 | 10/2019 | Yang et al. |
| 10,511,049 B2 | 12/2019 | Yang et al. |
| 10,566,652 B2 | 2/2020 | Dai et al. |
| 10,573,879 B2 | 2/2020 | Yang et al. |
| 10,629,941 B2 | 4/2020 | Dai et al. |
| 10,637,048 B2 | 4/2020 | Qi et al. |
| 10,673,046 B2 | 6/2020 | Dadheech et al. |
| 2009/0101421 A1* | 4/2009 | Oyobe .................... B60L 53/14 180/65.265 |
| 2011/0210698 A1* | 9/2011 | Sakai ........................ H02J 7/04 320/109 |
| 2011/0215767 A1 | 9/2011 | Johnson et al. |
| 2011/0248675 A1 | 10/2011 | Shiu et al. |
| 2012/0206296 A1 | 8/2012 | Wan |
| 2013/0119935 A1 | 5/2013 | Sufrin-Disler et al. |
| 2014/0152232 A1 | 6/2014 | Johnson et al. |
| 2014/0316630 A1* | 10/2014 | Kohlberger ............. B60L 53/11 701/22 |
| 2015/0329008 A1 | 11/2015 | Karlson et al. |
| 2017/0072810 A1* | 3/2017 | Cun ......................... F24F 11/00 |
| 2017/0350943 A1* | 12/2017 | Tani ....................... G01R 31/36 |
| 2018/0170194 A1* | 6/2018 | Ichikawa ............... B60W 10/26 |
| 2018/0267108 A1* | 9/2018 | Morita ................ H01M 10/486 |
| 2019/0154135 A1* | 5/2019 | Graf ........................ B60L 53/50 |
| 2019/0157882 A1* | 5/2019 | Sherback .............. H02J 7/0013 |
| 2019/0280333 A1 | 9/2019 | Dahn et al. |
| 2019/0280334 A1 | 9/2019 | Dahn et al. |
| 2019/0393546 A1 | 12/2019 | Dahn et al. |
| 2020/0412160 A1* | 12/2020 | Manzoor ................ B60L 50/60 |
| 2021/0046839 A1* | 2/2021 | Logvinov ............... B60L 53/63 |
| 2021/0091369 A1 | 3/2021 | Dadheech et al. |
| 2021/0091424 A1 | 3/2021 | Gao et al. |
| 2021/0218006 A1 | 7/2021 | Gao et al. |
| 2021/0226276 A1 | 7/2021 | Sevel et al. |
| 2021/0295619 A1* | 9/2021 | Tsuchiya ................. B60L 53/62 |
| 2022/0185135 A1* | 6/2022 | Langton .................. B60L 58/12 |
| 2023/0001824 A1* | 1/2023 | Shaotran ............ H01M 10/486 |
| 2023/0004901 A1* | 1/2023 | Shaotran ............... B60L 50/60 |

OTHER PUBLICATIONS

Mike Brown, Tesla's next software update will help solve a key issue with owning an EV, Sep. 30, 2021, 4 pages.

* cited by examiner

BATTERY PRECONDITIONING SYSTEMS AND METHODS FOR ELECTRIC-DRIVE VEHICLES

INTRODUCTION

The present disclosure relates generally to rechargeable electrochemical devices. More specifically, aspects of this disclosure relate to battery preconditioning systems and methods for direct-current fast charging (DCFC) of electric-drive vehicles.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, corner modules, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid-electric and full-electric vehicles (collectively "electric-drive vehicles"), on the other hand, utilize alternative power sources to propel the vehicle and, thus, minimize or eliminate reliance on a fossil-fuel based engine for tractive power.

A full-electric vehicle (FEV)—colloquially labeled an "electric car"—is a type of electric-drive vehicle configuration that altogether omits an internal combustion engine and attendant peripheral components from the powertrain system, relying instead on a rechargeable energy storage system (RESS) and a traction motor for vehicle propulsion. The engine assembly, fuel supply system, and exhaust system of an ICE-based vehicle are replaced with a single or multiple traction motors, a traction battery pack, and battery cooling and charging hardware in a battery-based FEV. Hybrid-electric vehicle (HEV) powertrains, in contrast, employ multiple sources of tractive power to propel the vehicle, most commonly operating an internal combustion engine assembly in conjunction with a battery-powered or fuel-cell-powered traction motor. Since hybrid-type, electric-drive vehicles are able to derive their power from sources other than the engine, HEV engines may be turned off, in whole or in part, while the vehicle is propelled by the electric motor(s).

Many commercially available hybrid electric and full electric vehicles employ a rechargeable traction battery pack to store and supply the requisite power for operating the powertrain's traction motor unit(s). In order to generate tractive power with sufficient vehicle range and speed, a traction battery pack is significantly larger, more powerful, and higher in capacity (Amp-hr) than a standard 12-volt starting, lighting, and ignition (SLI) battery. Contemporary traction battery packs, for example, group stacks of battery cells (e.g., 8-16 cells/stack) into individual battery modules (e.g., 10-40 modules/pack) that are mounted onto the vehicle chassis by a battery pack housing or support tray. Stacked electrochemical battery cells may be connected in series or parallel through use of an electrical interconnect board (ICB) or front-end DC bus bar assembly. A dedicated Electronic Battery Control Module (EBCM), through collaborative operation with a Powertrain Control Module (PCM) and Traction Power Inverter Module (TPIM), regulates the opening and closing of battery pack contactors to govern operation of the battery pack.

There are four primary types of batteries that are used in electric-drive vehicles: lithium-class batteries, nickel-metal hydride batteries, ultracapacitor batteries, and lead-acid batteries. As per lithium-class designs, lithium-metal (primary) batteries and lithium-ion (secondary) batteries make up the bulk of commercial lithium battery (LiB) configurations with Li-ion batteries being employed in automotive applications due to their enhanced stability, energy density, and rechargeable capabilities. A standard lithium-ion cell is generally composed to at least two conductive electrodes, an electrolyte material, and a permeable separator, all of which are enclosed inside an electrically insulated packaging. One electrode serves as a positive ("cathode") electrode and the other electrode serves as a negative ("anode") electrode during cell discharge. Rechargeable Li-ion batteries operate by reversibly passing lithium ions back and forth between these negative and positive electrodes. The separator—oftentimes a microporous polymeric membrane—is disposed between the two electrodes to prevent electrical short circuits while also allowing the transport of ionic charge carriers. The electrolyte is suitable for conducting lithium (Li) ions and may be in solid form (e.g., solid state diffusion), liquid form (e.g., liquid phase diffusion), or quasi-solid form (e.g., solid electrolyte entrained within a liquid carrier). Lithium-ions move from the negative electrode to the positive electrode during discharge of the battery while under load, and in the opposite direction when recharging the battery.

SUMMARY

Presented herein are closed-loop feedback battery systems with attendant control logic for preconditioning rechargeable batteries, methods for manufacturing and methods for operating such systems, and electric-drive vehicles with battery preconditioning capabilities. By way of example, there are presented battery thermal preconditioning (BTP) systems and methods for preparing rechargeable batteries for DCFC charging. Unlike Level 1 and Level 2 electric vehicle charging stations (EVCS), which predominantly use alternating current (AC) with plugs that output 120-240 volts alternating current (VAC) and operate at power ratings of less than 15 kilowatts (kW), a Level 3 DCFC plug runs direct current with a 400-600 VAC input power and a power rating of 150-350 kW. In so doing, a typical DCFC charger is able to fully charge a standard vehicle battery pack in under 30 mins, compared to the two to ten hours required by most Level 2 chargers. To prepare for a DCFC charging event, the BTP system may set a target battery temperature for optimal fast charging efficiency. A time to condition a battery for DCFC may be predicted by modelling battery and thermal behavior from a present state of voltage (SOV) or state of charge (SOC) level to an estimated SOV/SOC level when arriving at a DC fast charger. The battery and thermal model may also be used to estimate a predicted battery temperature when arriving at the fast charger and to determine whether or not this predicted battery temperature needs to be raised or lowered to achieve the target temperature for efficient DCFC charging. Time to condition for DCFC may be calculated from the temperature difference and compared with an estimated time of arrival to the DC fast charger to decide when to automatically trigger the battery's thermal system to start battery preconditioning.

Attendant benefits for at least some of the disclosed concepts include closed-loop feedback control systems that provision more effective preconditioning of rechargeable batteries for more efficient recharging. By improving charging efficiency, disclosed BTP systems help to decrease charging times with a concomitant reduction in energy waste. Disclosed features may also help to improve customer satisfaction and experience through enhanced vehicle charging and reduced range anxiety. Battery life, performance, and capacity may also be improved through implementation of optimal charging temperatures. In addition to improved charging capabilities, disclosed concepts may help to increase driving range and pack performance for electric-drive vehicles.

Aspects of this disclosure are directed to system control logic, closed-loop feedback control techniques, and computer-readable media (CRM) for preconditioning electrochemical devices for charging the devices. In an example, a method is presented for operating a battery system of a motor vehicle. This representative method includes, in any order and in any combination with any of the above and below disclosed options and features: receiving, e.g., via a resident or remote system controller from an in-vehicle occupant input device, one or more recharge signals indicating a request to schedule a recharge event for a battery of the vehicle's battery system at a selected battery charging station; determining, e.g., via the system controller using a memory-stored lookup table responsive to receiving the recharge signal(s), a target precondition temperature devised to optimize the recharge event of the battery; determining, e.g., via the system controller using real-time sensor data from one or more electrical sensors, a present SOV or SOC for the battery at motor vehicle's present location; estimating, e.g., using a memory-stored lookup table and the present SOV/SOC, a predicted SOV/SOC for the battery upon arrival of the vehicle at the battery charging station's location, which is distinct from the vehicle's present location; estimating, e.g., using historical driving behavior of the vehicle and the predicted SOV/SOC, a predicted battery preconditioning time to thermally precondition the battery to the target precondition temperature; and transmitting, e.g., via the system controller to the battery system's thermal control system, one or more command signal(s) to precondition the battery based on the present SOV/SOC, target precondition temperature, and battery preconditioning time.

Additional aspects of this disclosure are directed to closed-loop feedback control systems for preconditioning rechargeable batteries, rechargeable energy storage systems (RESS) employing such preconditioning control systems, and motor vehicles equipped with such RESS and preconditioning capabilities. As used herein, the terms "vehicle" and "motor vehicle" may be used interchangeably and synonymously to include any relevant vehicle platform, such as passenger vehicles (ICE, HEV, FEV, fuel cell, fully and partially autonomous, etc.), commercial vehicles, industrial vehicles, tracked vehicles, off-road and all-terrain vehicles (ATV), motorcycles, farm equipment, watercraft, aircraft, e-bikes, e-scooters, etc. In an example, a motor vehicle includes a vehicle body with a passenger compartment, multiple road wheels rotatably mounted to the vehicle body (e.g., via wheel corner modules coupled to a unibody chassis or a body-on-frame chassis), and other standard original equipment. For electric-drive vehicle applications, one or more electric traction motors operate alone (e.g., for FEV powertrains) or in conjunction with an internal combustion engine assembly (e.g., for HEV powertrains) to selectively drive one or more of the road wheels to propel the vehicle. A battery system, which includes a rechargeable traction battery pack and a thermal management system, is mounted onto the vehicle body and operable to power the traction motor(s).

Continuing with the discussion of the preceding example, the vehicle also includes a resident or remote vehicle controller (e.g., electronic control unit, control module, or network of controllers/modules) that regulates, among other things, operation of the battery system. The controller is programmed to receive one or more electronic signals indicating a request to schedule a recharge event for the vehicle's traction battery pack at a selected battery charging station. Upon receipt of the recharge request, the controller responsively determines a target pack temperature devised to optimize the recharging of the battery pack. The controller also determines a present SOV/SOC for the battery pack at the vehicle's current location and a predicted SOV/SOC when the vehicle arrives at the charging station location. Using the present and predicted SOVs/SOCs, the controller estimates a preconditioning time to thermally precondition the traction battery pack to the target precondition temperature. One or more preconditioning signals are then transmitted to the thermal management system to precondition the battery pack based on the present and predicted SOVs/SOCs, target precondition temperature, and battery preconditioning time.

For any of the disclosed systems, vehicles, and methods, the system controller may determine a charger power, such as the charging station's power rating (kW) and/or voltage output (VDC/VAC), e.g., by retrieving the data from a web mapping platform, cloud computing service, or navigation database. In this instance, the target precondition temperature is determined using the battery charging station's power rating/voltage output. Upon receipt of a recharge request, the system controller may responsively determine if a system fault exists in the battery system or a state variable is active for the motor vehicle, either of which would likely prevent battery preconditioning. A battery preconditioning time may be estimated upon confirming that there is neither a system fault nor an active vehicle state variable that would prevent preconditioning. As yet a further option, battery preconditioning may be delayed or deactivated if the system fault/state variable persists.

For any of the disclosed systems, vehicles, and methods, a travel time is estimated for the subject vehicle to drive from the vehicle's current location to the charging station's location. In this instance, the manner in which the thermal system preconditions the battery may be selectively varied based, at least in part, on the estimated travel time. Moreover, estimating the predicted SOV for the battery may include deriving an SOV expenditure of the battery associated with the estimated travel time (e.g., SOV depletion to reach the EVCS in light of historical driving behavior). In this example, the predicted SOV is the mathematical difference between the present SOV and the predicted SOV expenditure of the battery. As yet a further option, the system controller may determine if the estimated travel time is greater than the predicted battery preconditioning time; if so, the controller may delay transmitting the preconditioning signal(s) to the thermal system. Conversely if the predicted battery preconditioning time is greater than the estimated travel time, preconditioning may be commenced immediately and/or modulated in light of the insufficient time to precondition.

For any of the disclosed systems, vehicles, and methods, estimating the predicted battery preconditioning time includes modeling the thermal management system's behavior and the battery's operating behavior for the drive from the vehicle's present location to the charging station's location. Modeling the thermal system behavior and the battery operating behavior may include executing an iterative model and simulation tool as a function of ambient temperature data, past driving behavior data of the subject vehicle, current battery temperature data of the battery, the present and predicted SOVs, etc. The target temperature may optimize recharging of the battery by reducing a total charge time for the recharge event while reducing a total system energy expenditure of the battery system to precondition the battery.

For any of the disclosed systems, vehicles, and methods, determining a battery's present SOV may include receiving measured voltage data from one or more voltage sensors operatively attached to the battery, and executing an SOV modeling algorithm using the measured voltage data to determine the present SOV. Unlike state of charge (SOC), SOV may be typified as a measure of the difference between real-time voltage output and a low-voltage cutoff during discharge of the battery. The battery system may also monitor the status of the battery preconditioning and output the preconditioning status data to a human-machine interface (HMI) within the vehicle. The recharge signal may be received from the vehicle driver or other occupant via an in-vehicle user-input device.

The above summary does not represent every embodiment or every aspect of this disclosure. Rather, the above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes any and all combinations and subcombinations of the elements and features described above and below.

Figure 1:
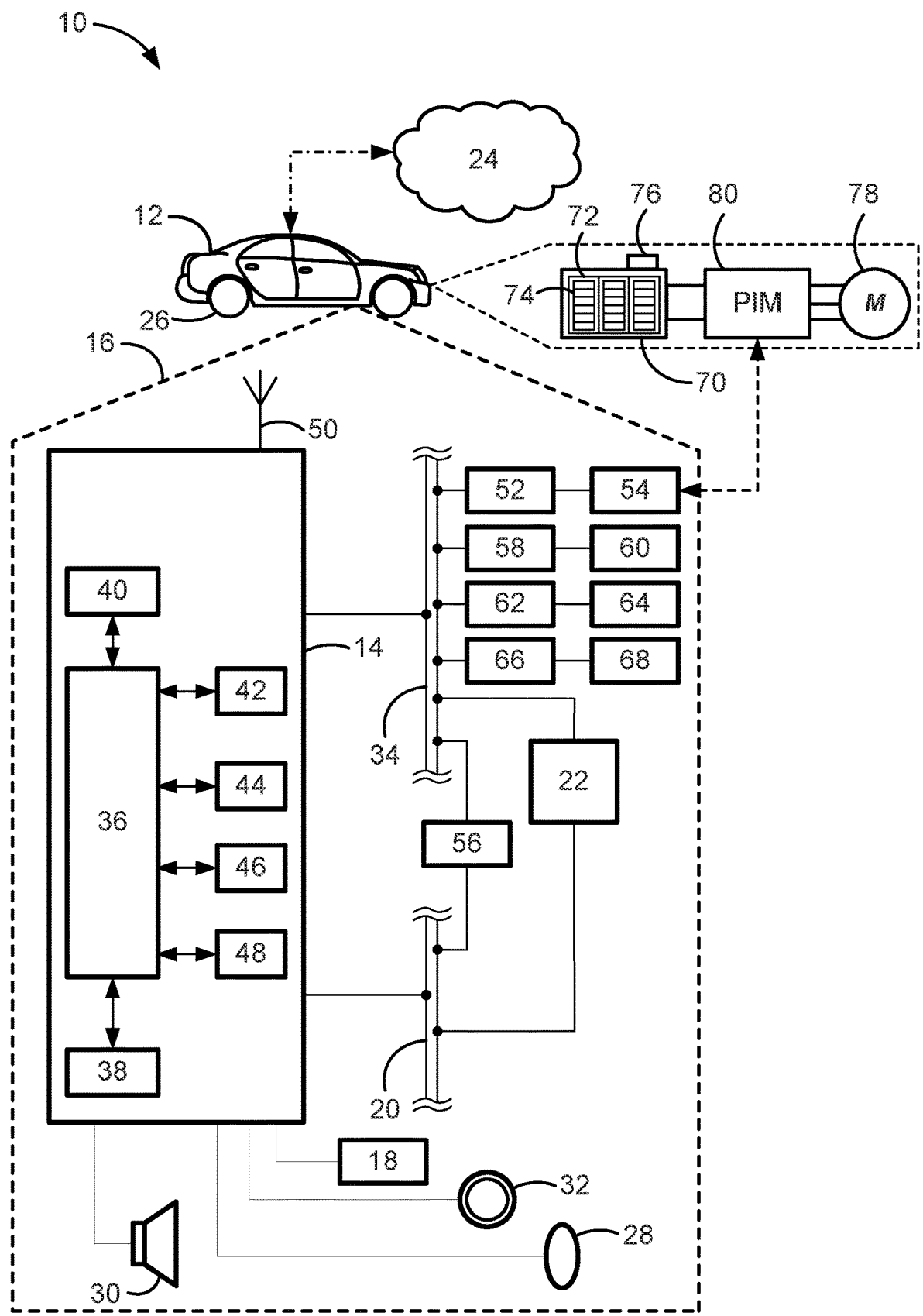
FIG. 1 is a partially schematic, side-view illustration of a representative motor vehicle with an electrified powertrain and a network of in-vehicle controllers, sensing devices, input/output devices, and communication devices for battery preconditioning prediction for recharging a battery pack according to aspects of the disclosed concepts.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for instance, by the appended claims.

DETAILED DESCRIPTION

This disclosure is susceptible of embodiment in many different forms. Representative examples of the disclosure are shown in the drawings and herein described in detail with the understanding that these embodiments are provided as an exemplification of the disclosed principles, not limitations of the broad aspects of the disclosure. To that end, elements and limitations that are described, for example, in the Abstract, Introduction, Summary, Description of the Drawings, and Detailed Description sections, but not explicitly set forth in the claims, should not be incorporated into the claims, singly or collectively, by implication, inference, or otherwise. Moreover, the drawings discussed herein may not be to scale and are provided purely for instructional purposes. Thus, the specific and relative dimensions shown in the Figures are not to be construed as limiting.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and permutations thereof, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle, when the vehicle is operatively oriented on a horizontal driving surface.

Referring now to the drawings, wherein like reference numbers refer to like features throughout the several views, there is shown in FIG. 1 a representative automobile, which is designated generally at 10 and portrayed herein for purposes of discussion as a sedan-style, electric-drive passenger vehicle. The illustrated automobile 10—also referred to herein as "motor vehicle" or "vehicle" for short—is merely an exemplary application with which novel aspects of this disclosure may be practiced. In the same vein, incorporation of the present concepts into an all-electric vehicle powertrain should also be appreciated as a non-limiting implementation of disclosed features. As such, it will be understood that aspects and features of this disclosure may be applied to other powertrain architectures, may be implemented for any logically relevant type of vehicle, and may be utilized for both DC and AC-based EVCS. Moreover, only select components of the motor vehicles and battery systems are shown and described in additional detail herein. Nevertheless, the vehicles and vehicle systems discussed below may include numerous additional and alternative features, and other available peripheral components, for carrying out the various methods and functions of this disclosure.

The representative vehicle 10 of FIG. 1 is originally equipped with a vehicle telecommunication and information ("telematics") unit 14 that wirelessly communicates, e.g., via cell towers, base stations, mobile switching centers, satellite service, etc., with a remotely located or "off-board" cloud computing host service 24 (e.g., ONSTAR®). Some of the other vehicle hardware components 16 shown generally in FIG. 1 include, as non-limiting examples, a touchscreen video display device 18, a microphone 28, audio speakers 30, and assorted input controls 32 (e.g., buttons, knobs, pedals, switches, touchpads, joysticks, touchscreens, etc.). These hardware components 16 function, in part, as a human/machine interface (HMI) to enable a user to communicate with the telematics unit 14 and other system components within and external to the vehicle 10. Microphone 28 provides a vehicle occupant with means to input verbal or other auditory commands; the vehicle 10 may be equipped with an embedded voice-processing unit utilizing audio filtering, editing, and analysis modules. Conversely, the speaker(s) 30 provide audible output to a vehicle occupant and may be either a stand-alone speaker dedicated for use with the telematics unit 14 or may be part of an audio system 22. The audio system 22 is operatively connected to a network connection interface 34 and an audio bus 20 to receive analog information, rendering it as sound, via one or more speaker components.

Communicatively coupled to the telematics unit 14 is a network connection interface 34, suitable examples of which include twisted pair/fiber optic Ethernet switch, parallel/serial communications bus, local area network (LAN) interface, controller area network (CAN) interface, media-oriented system transfer (MOST) interface, local interconnection network (LIN) interface, and the like. Other appropriate communication interfaces may include those that conform with ISO, SAE, and/or IEEE standards and specifications. The network connection interface 34 enables the vehicle hardware 16 to send and receive signals with one another and with various systems and subsystems both within or "resident" to the vehicle body 12 and outside or "remote" from the vehicle body 12. This allows the vehicle 10 to perform various vehicle functions, such as modulating powertrain output, governing operation of the vehicle's transmission, selectively engaging the friction and regenerative brake systems, controlling vehicle steering, regulating charge and discharge and conditioning of the vehicle's battery modules, and other automated functions. For instance, telematics unit 14 may receive and transmit signals and data to/from a Powertrain Control Module (PCM) 52, an Advanced Driver Assistance System (ADAS) module 54, an Electronic Battery Control Module (EBCM) 56, a Steering Control Module (SCM) 58, a Brake System Control Module (BSCM) 60, and assorted other vehicle modules, such as a transmission control module (TCM), engine control module (ECM), Sensor System Interface Module (SSIM), navigation system control (NSC) module, etc.

With continuing reference to FIG. 1, telematics unit 14 is an onboard computing device that provides a mixture of services, both individually and through its communication with other networked devices. This telematics unit 14 is generally composed of one or more processors 40, each of which may be embodied as a discrete microprocessor, an application specific integrated circuit (ASIC), or a dedicated control module. Vehicle 10 may offer centralized vehicle control via a central processing unit (CPU) 36 that is operatively coupled to a real-time clock (RTC) 42 and one or more electronic memory devices 38, each of which may take on the form of a CD-ROM, magnetic disk, IC device, flash memory, semiconductor memory (e.g., various types of RAM or ROM), etc.

Long-range vehicle communication capabilities with remote, off-board networked devices may be provided via one or more or all of a cellular chipset/component, a navigation and location chipset/component (e.g., global positioning system (GPS) transceiver), or a wireless modem, all of which are collectively represented at 44. Close-range wireless connectivity may be provided via a short-range wireless communication device 46 (e.g., a BLUETOOTH® unit or near field communications (NFC) transceiver), a dedicated short-range communications (DSRC) component 48, and/or a dual antenna 50. It should be understood that the vehicle 10 may be implemented without one or more of the components depicted in FIG. 1 or, optionally, may include additional components and functionality as desired for a particular end use. The various communication devices described above may be configured to exchange data as part of a periodic broadcast in a vehicle-to-vehicle (V2V) communication system or a vehicle-to-everything (V2X) communication system, e.g., Vehicle-to-Infrastructure (V2I), Vehicle-to-Pedestrian (V2P), Vehicle-to-Device (V2D), etc.

CPU 36 receives sensor data from one or more sensing devices that use, for example, photo detection, radar, laser, ultrasonic, optical, infrared, or other suitable technology for executing an automated driving operation, including short range communications technologies such as DSRC or Ultra-Wide Band (UWB). In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion and analysis hardware and software for processing raw sensor data. The type, placement, number, and interoperability of the distributed array of in-vehicle sensors may be adapted, singly or collectively, to a given vehicle platform for achieving a desired level of autonomous vehicle operation.

Digital camera 62 may use a charge coupled device (CCD) sensor or other suitable optical sensor to generate images indicating a field-of-view of the vehicle 10, and may be configured for continuous image generation, e.g., at least about 35+ images per second. By way of comparison, range sensor 64 may emit and detect reflected radio, infrared, light-based or other electromagnetic signals (e.g., short-range radar, long-range radar, EM inductive sensing, Light Detection and Ranging (LIDAR), etc.) to detect, for example, presence, geometric dimensions, and/or proximity of a target object. Vehicle speed sensor 66 may take on various forms, including wheel speed sensors that measure wheel speeds, which are then used to determine real-time vehicle speed. In addition, the vehicle dynamics sensor 68 may be in the nature of a single-axis or a triple-axis accelerometer, an angular rate sensor, an inclinometer, etc., for detecting longitudinal and lateral acceleration, yaw, roll, and/or pitch rates, or other dynamics related parameters. Using data from the sensing devices 62, 64, 66, 68, the CPU 36 identifies surrounding driving conditions, determines roadway characteristics and surface conditions, identifies target objects within a detectable range of the vehicle, determines attributes of the target object, such as size, relative position, distance, angle of approach, relative speed, etc., and executes automated control maneuvers based on these executed operations.

To propel the electric-drive vehicle 10, an electrified powertrain is operable to generate and deliver tractive torque to one or more of the vehicle's road wheels 26. The powertrain is generally represented in FIG. 1 by a rechargeable energy storage system (RESS), which may be in the nature of a chassis-mounted traction battery pack 70, that is operatively connected to an electric traction motor 78. The traction battery pack 70 is generally composed of one or more battery modules 72 each having a stack of battery cells 74, such as lithium ion, lithium polymer, or nickel metal hydride battery cells of the pouch, can, or prismatic type. One or more electric machines, such as traction motor/generator (M) units 78, draw electrical power from and, optionally, deliver electrical power to the RESS's battery pack 70. A dedicated power inverter module (PIM) 80 electrically connects the battery pack 70 to the motor/ generator (M) unit(s) 78 and modulates that transmission of electrical current therebetween.

The battery pack 70 may be configured such that module management, including cell sensing, thermal management, and module-to-host communications functionality, is integrated directly into each battery module 72 and performed wirelessly via a wireless-enabled cell monitoring unit (CMU) 76. The CMU 76 may be a microcontroller-based, printed circuit board (PCB)—mounted sensor array. Each CMU 76 may have a GPS transceiver and RF capabilities and may be packaged on or in a battery module housing. The battery module cells 74, CMU 76, housing, coolant lines, busbars, etc., collectively define the module assembly.

Figure 2:
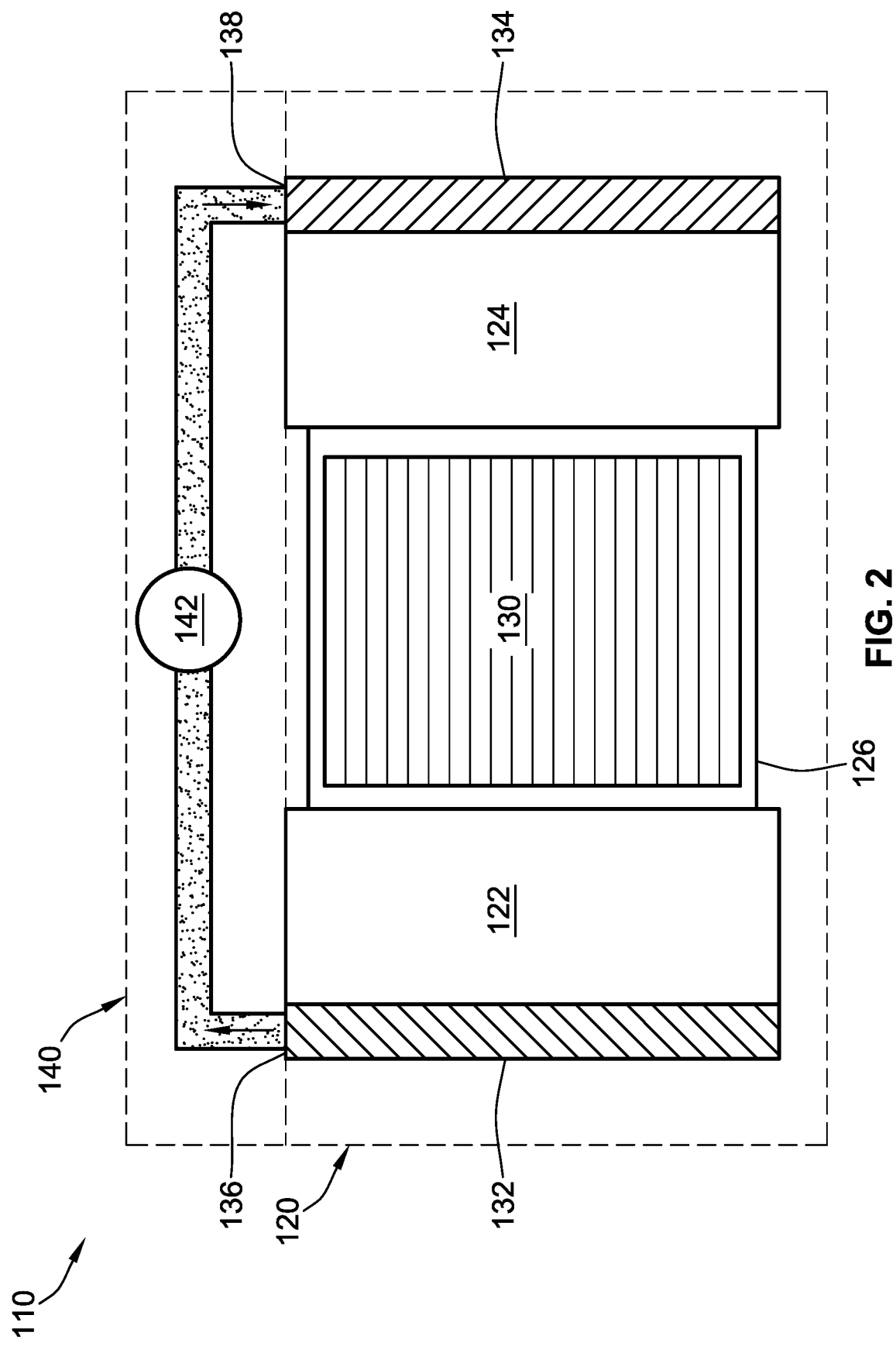
FIG. 2 is a schematic illustration of a representative lithium-class electrochemical device that operates in accordance with aspects of the present disclosure.

Presented in FIG. 2 is an exemplary electrochemical device in the form of a rechargeable lithium-class battery 110 that powers a desired electrical load, such as automobile 10 of FIG. 1, and offers fast charging capabilities, such as DCFC. Battery 110 includes a pair of electrically conductive electrodes, namely a first (negative or anode) working electrode 122 and a second (positive or cathode) working electrode 124, packaged inside a protective outer housing 120. In at least some configurations, the battery housing 120 may be an envelope-like pouch that is formed of aluminum foil or other suitable sheet material. Both sides of a metallic pouch may be coated with a polymeric finish to insulate the metal from the internal cell elements and from adjacent cells, if any. Alternatively, the battery housing (or "cell casing") 120 may take on a cylindrical metal can configuration, i.e., for cylindrical battery cell configurations, or a polyhedral metal box configuration, i.e., for prismatic battery cell configurations. Reference to either working electrode 122, 124 as an "anode" or "cathode" or, for that matter, as "positive" or "negative" does not limit the electrodes 122, 124 to a particular polarity as the system polarity may change depending on whether the battery 110 is being operated in a charge mode or a discharge mode. Although FIG. 2 illustrates a single battery cell unit inserted within the battery housing 120, it should be appreciated that the housing 120 may stow therein a stack of multiple cell units (e.g., five to five thousand cells or more).

With continuing reference to FIG. 2, anode electrode 122 may be fabricated with an active anode electrode material that is capable of incorporating lithium ions during a battery charging operation and releasing lithium ions during a battery discharging operation. In at least some implementations, the anode electrode 122 is manufactured, in whole or in part, from a lithium metal, such as lithium-aluminum (LiAl) alloy materials with an Li/Al atomic ratio in a range from 0 at. %≤Li/Al<70 at. %, and/or aluminum alloys with Al atomic ratio >50 at. % (e.g., lithium metal is smelt). Additional examples of suitable active anode electrode materials include carbonaceous materials (e.g., graphite, hard carbon, soft carbon etc.), silicon, silicon-carbon blended materials (silicon-graphite composite), $Li_4Ti_5O_{12}$, transition-metals (alloy types, e.g., Sn), metal oxide/sulfides (e.g., $SnO_2$, FeS and the like), etc.

Cathode electrode 124 may be fabricated with an active cathode electrode material that is capable of supplying lithium ions during a battery charging operation and incorporating lithium ions during a battery discharging operation. The cathode 124 material may include, for instance, lithium transition metal oxide, phosphate, or silicate, such as $LiMO_2$ (M=Co, Ni, Mn, or combinations thereof); $LiM_2O_4$ (M=Mn, Ti, or combinations thereof), $LiMPO_4$ (M=Fe, Mn, Co, or combinations thereof), and $LiM_xM'_{2-x}O_4$ (M, M'=Mn or Ni). Additional examples of suitable active cathode electrode materials include lithium nickel cobalt manganese oxide (NCM), lithium nickel cobalt aluminum oxide (NCA), lithium nickel cobalt manganese aluminum oxide (NCMA), and other lithium transition-metal oxides.

Disposed inside the battery housing 120 between the two electrodes 122, 124 is a porous separator 126, which may be in the nature of a microporous or nanoporous polymeric separator. The porous separator 126 may include a non-aqueous fluid electrolyte composition and/or solid electrolyte composition, collectively designated 130, which may also be present in the negative electrode 122 and the positive electrode 124. A negative electrode current collector 132 may be positioned on or near the negative electrode 122, and a positive electrode current collector 134 may be positioned on or near the positive electrode 124. The negative electrode current collector 132 and positive electrode current collector 134 respectively collect and move free electrons to and from an external circuit 140. An interruptible external circuit 140 with a load 142 connects to the negative electrode 122, through its respective current collector 132 and electrode tab 136, and to the positive electrode 124, through its respective current collector 134 and electrode tab 138. Separator 126 may be a sheet-like structure that is composed of a porous polyolefin membrane, e.g., with a porosity of about 35% to 65% and a thickness of approximately 25-30 microns. Electrically non-conductive ceramic particles (e.g., silica) may be coated onto the porous membrane surfaces of the separators 126.

The porous separator 126 may operate as both an electrical insulator and a mechanical support structure by being sandwiched between the two electrodes 122, 124 to prevent the electrodes from physically contacting each other and, thus, the occurrence of a short circuit. In addition to providing a physical barrier between the electrodes 122, 124, the porous separator 126 may provide a minimal resistance path for internal passage of lithium ions (and related anions) during cycling of the lithium ions to facilitate functioning of the battery 110. For some optional configurations, the porous separator 126 may be a microporous polymeric separator including a polyolefin. The polyolefin may be a homopolymer, which is derived from a single monomer constituent, or a heteropolymer, which is derived from more than one monomer constituent, and may be either linear or branched. In a solid-state battery, the role of the separator may be partially/fully provided by a solid electrolyte layer.

Operating as a rechargeable energy storage system (RESS), battery 110 generates electric current that is transmitted to one or more loads 142 operatively connected to the external circuit 140. While the load 142 may be any number of electrically powered devices, a few non-limiting examples of power-consuming load devices include an electric motor for a hybrid or full-electric vehicle, a laptop or tablet computer, a cellular smartphone, cordless power tools and appliances, portable power stations, etc. The battery 110 may include a variety of other components that, while not depicted herein for simplicity and brevity, are nonetheless readily available. For instance, the battery 110 may include one or more gaskets, terminal caps, tabs, battery terminals, and other commercially available components or materials that may be situated on or in the battery 110. Moreover, the size and shape and operating characteristics of the battery 110 may vary depending on the particular application for which it is designed.

Discussed below are thermal preconditioning protocols for priming electrochemical devices for a fast-charging event, such as recharging an in-vehicle traction battery pack via DCFC. Dynamic target temperature selection based on historical driving behavior and available charge power at the destination fast charger, for example, allows a battery system to optimally use available system energy to bring the battery's operating temperature to within a predicted "most efficient" charging temperature zone. The preconditioning feature may be automatically triggered and stopped in order to complete the thermal conditioning without wasting vehicle energy. The thermal preconditioning algorithm may perform the following high-level tasks: set a target battery temperature based on a present SOV or SOC and an estimated SOV or SOC of the battery upon arrival at the charger; estimate the time it will take to thermally condition the battery to the target temperature by modelling battery and thermal behavior during the trip to the charger; and decide whether and when to start conditioning based on the distance to charger versus the time to condition.

Figure 3:
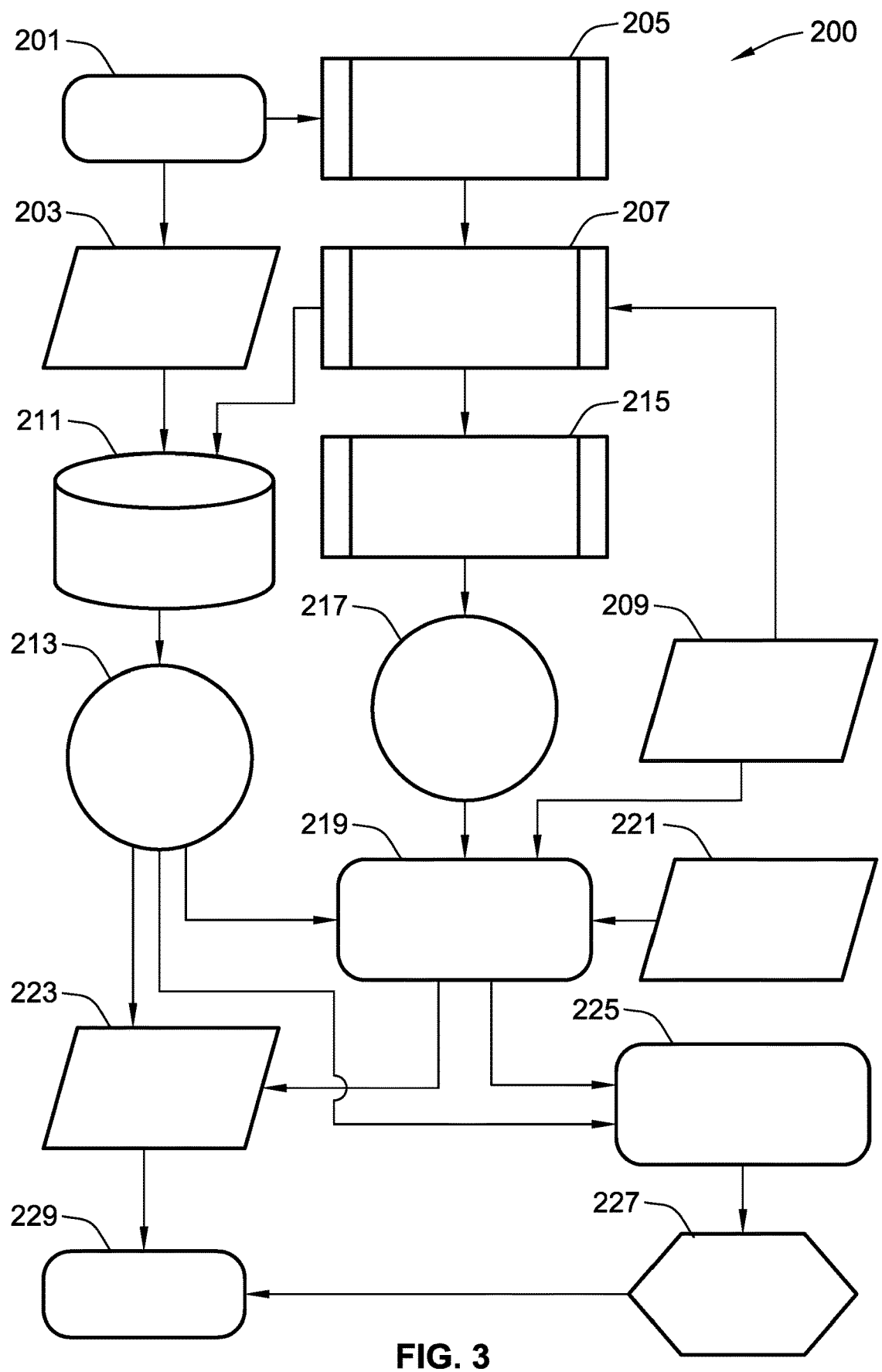
FIG. 3 is a flowchart illustrating a representative closed-loop feedback control protocol for preconditioning a battery of a motor vehicle, which may correspond to memory-stored instructions that are executable by a resident or remote controller, control-logic circuit, programmable control unit, or other integrated circuit (IC) device or network of devices in accord with aspects of the disclosed concepts.

With reference next to the flow chart of FIG. 3, an improved method or control strategy for preconditioning an electrochemical device, such as vehicle battery pack 70 of FIG. 1 or lithium-class battery 110 of FIG. 2, using a fast-charging system, such as a Level 3 DC fast charger, is generally described at 200 in accordance with aspects of the present disclosure. Some or all of the operations illustrated in FIG. 3, and described in further detail below, may be representative of an algorithm that corresponds to processor-executable instructions that are stored, for example, in main or auxiliary or remote memory (e.g., memory device 38 or host service 24 database of FIG. 1), and executed, for example, by an electronic controller, processing unit, logic circuit, or other module or device or network of modules/devices (e.g., CPU 36 and/or cloud computing service 24 of FIG. 1), to perform any or all of the above and below described functions associated with the disclosed concepts. It should be recognized that the order of execution of the illustrated operation blocks may be changed, additional operation blocks may be added, and some of the described operations may be modified, combined, or eliminated.

Method 200 of FIG. 3 begins at START terminal block 201 with memory-stored, processor-executable instructions for a programmable controller or control module or similarly suitable processor to call up an initialization procedure for scheduling a battery recharge event at a selected battery charging station. System evaluation for provisioning this routine may be executed in real-time, near real-time, continuously, systematically, sporadically, and/or at regular intervals, for example, each 10 or 100 milliseconds during normal and ongoing operation of the motor vehicle 10. As yet another option, terminal block 201 may initialize responsive to a user command prompt, a resident vehicle controller prompt, or a broadcast prompt signal received from an "off-board" centralized vehicle services system (e.g., host cloud computing service 24). As a non-limiting example, battery preconditioning and recharge may be enabled from a downloadable mobile software application ("app"), an HMI interface within the vehicle, or by an in-vehicle control module, such as the ADAS or EBCM modules 54, 56 of FIG. 1. Telematics unit 14 in electric-drive vehicle 10 of FIG. 1, for example, may display a notification that the traction battery pack 70 has a low state of charge; the driver may press a soft button to schedule a recharge event and select a desired charging station from a drop-down list or a navigation map. Upon completion of the control operations presented in FIG. 3, the method 200 may advance to END terminal block 229 and temporarily terminate or, optionally, may loop back to terminal block 201 and run in a continuous loop.

Upon receipt of a request to schedule a recharge event, method 200 responsively advances to CHARGER POWER data input block 203 to ascertain the operating characteristics of the selected battery charging station. These operating characteristics may include a power rating (e.g., in kW), a voltage output (e.g., in VDC), charging cable plug compatibility (for plug-in vehicles), communication network interoperability (e.g., NFC, DSRC, or BLUETOOTH® compatibility), etc. Returning to FIG. 1 as a non-limiting example, CPU 36 and EBCM 56 may collaboratively retrieve this information by wirelessly polling the selected charging station, pulling the data from the cloud 24, or assembling the data from open street map sources using resident navigation software. A lack of compatibility between the host vehicle and the selected charging station may result in the driver being prompted to select another available charging station.

In addition to identifying charger power characteristics at data input block 203, method 200 may also automatically respond to a requested recharge event by evaluating select vehicle operating characteristics for running a prediction model at PRECONDITIONING CONDITIONS subroutine block 205. CPU 36 of FIG. 1, for example, may wirelessly poll cell monitoring unit 76 to retrieve real-time or near real-time diagnostic information for the traction battery pack 70. From this data, the CPU 36 is able to ascertain whether or not a system fault exists within the battery system that is likely to prevent preconditioning of the pack 70. One example of such a battery system fault includes a contactor fault within the traction power inverter module 80 that precludes the transfer of current to/from the pack 70. Another example includes a pack sensor fault or an SSIM fault that precludes accurate analysis of pack SOV/SOC. When executing predefined subroutine block 205, CPU 36 may also poll PCM 52 and EBCM 56 to retrieve real-time or near real-time propulsion system and battery system information to identify an active vehicle state variable, if any, that is likely to prevent battery preconditioning. Checking vehicle state variables may include confirming that the vehicle 10 is in a "propulsion system active" mode or confirming that the current SOC of the traction battery pack 70 is above a predefined minimum value (e.g., to ensure pack conditioning can be implemented without impeding the vehicle's ability to reach the charging station). Upon confirming that there are no existing system faults nor any active vehicle state variables that would impede battery conditioning, method 200 proceeds to predict battery SOV/SOC, estimate target preconditioning temps, and project battery preconditioning times.

Method 200 advances from predefined subroutine block 205 to PREDICTED SOV/SOC subroutine block 207 to estimate a state of voltage and/or a state of charge for the rechargeable battery upon arrival at the selected charging station. SOV may be used to replace SOC during system evaluation as SOV may be a more accurate indicator of when a battery is likely to shutdown (e.g., under heavy loads, shutdown may occur before SoC reaches 0%). SOV may be considered a naturally adaptive measure for end-of-range prediction as it indirectly describes a battery's power delivery capabilities using terminal voltage behavior under loaded conditions. State of voltage monitoring for a traction battery pack may describe the pack's real-time power capability by measuring the relative stiffness of the battery system; low battery stiffness, which is indicative of a large voltage drops under load, may suggest high internal resistances and poor power capability.

Predicting a battery's SOV/SOC at subroutine block 207 may involve ascertaining a real-time or near real-time SOV/SOC, forecasting an SOV/SOC battery expenditure associated with an estimated travel time to the charging station location, and calculating the predicted SOV/SOC as the mathematical difference between the present SOV/SOC and the SOV/SOC battery expenditure. Real-time/near real-time SOV/SOC at a subject vehicle's current location is assessed at CURRENT SOV/SOC data input block 209. In this instance, determining the present SOV for a battery may include receiving measured voltage data from one or more voltage sensors operatively attached to the battery, and executing an SOV modeling algorithm (e.g., fuzzy logic, zero-phase equivalent, etc.) based, at least in part, on the measured voltage data to determine the present SOV. To estimate an SOV battery expenditure, the CPU 36 may retrieve a memory-stored lookup table with a time array of data that associates a series of battery use times with corresponding SOV usage, e.g., as calibrated to the make/model of a specific pack. While discussed herein with reference to state of voltage, it is envisioned that alternative system models and attendant control processes may be derived to employ state of charge, state of energy, or other suitable measure of state of health.

With continuing reference to FIG. 3, the method 200 utilizes the charger power characteristics output from data input block 203 and the predicted SOV/SOC output from subroutine block 207 to estimate an optimized temperature for preconditioning a battery, as indicated at DCFC TARGET TEMPERATURE database block 211. The target preconditioning temperature is devised to enhance the recharge event of the battery. In particular, a target temperature optimizes a scheduled recharging for a battery by minimizing a total charge time for the recharge event while concomitantly minimizing a total system energy expenditure to precondition the battery without damaging the individual battery cells or any of the electrical hardware in the high-voltage electrical system connecting the battery to its various loads. In an example, CPU 36 accesses a set of memory-stored lookup tables, each of which associates a series of battery temperatures with corresponding SOV values. Each lookup table may be associated with a particular set of charger characteristics (e.g., power rating and/or voltage output). Generally speaking, the method 200 is attempting to identify what battery temperature or temp range increases charging speed by heating/cooling the battery so that it will accept the full charging capabilities of the selected charge station. For instance, a subject battery may only be able to charge at 50 kW when at 30% SOV and −10° C.; however, the same battery may be able to charge at 300+kW when heated to 20° C. battery temperature. If the predicted SOV is approximately 30% and the selected charging station is a Level 3 DCFC charging station with 350 kW power capacity, the target temp may be set to approximately 20° C. These values will differ for a Level 1 charging station operating at 120 VAC and 1.4-4.2 kW as well as a Level 2 charging station operating at 240 VAC and 6.2-8.2 kW. The target preconditioning temperature is then output at process block 213.

Prior to, contemporaneous with, or after deriving an optimal preconditioning temperature, method 200 carries out process-executable instructions provided by PREDICTION MODEL subroutine block 215 to estimate the time that will be needed to complete preconditioning of the battery. Estimating a predicted battery preconditioning time to thermally precondition the battery to a target precondition temperature may include modeling the operating behavior of the battery system's internal thermal system and the operating behavior of the traction battery pack for the drive from the vehicle's current location to the charging station's location. In order to model the thermal system behavior and the battery operating behavior, the CPU 36 may execute an iterative (thermal plant) model and a battery simulation tool as a function of ambient temperature data, past driving behavior data of the motor vehicle, current battery temperature data, the present SOV/SOC, and the predicted SOV/SOC.

The prediction model may perform a Model Loop Determination, which receives as inputs a Loop SOV, a Target SOV, and an Active Cooling/Heating Enabled parameter. This Model Loop Determination then outputs a Loop Counter, Loop SOV, Model Delta Time and Model Total Time. The model then calls a set of functions, including a Battery Electric Model, a Battery Thermal Model, and an Active Cooling/Heating Determination Loop. The Battery Electric Model receives as inputs a Current parameter, the Loop SOV, and a Loop Battery Temp, and then outputs a Loop Battery Electrical Thermal Power. By comparison, the Battery Thermal Model receives as inputs the Loop Battery Electrical Thermal Power, the Active Cooling/Heating Thermal Power, an Ambient Thermal Power, and the Model Delta Time, and outputs a Loop Battery Temp. In the last of the call functions, the Active Cooling/Heating Determination Loop receives as inputs the Loop Battery Temp, the Loop SOV, and a Predicted Charger Power, and then outputs an Active Cooling Enabled value, an Active Cooling Power value, an Active Heating Enabled value, and an Active Heating Power value. After the final loop, a Time to Condition Calculation is performed, which receives as inputs an Estimated Time to DCFC and a Model Time to DCFC and Time to Condition; the final output is the Time to Thermal Condition. In addition to predicting the time needed for preconditioning, the battery/thermal system modeling may also output a predicted battery temperature that may be used to "debug" the model. The model may forecast a final predicted temp for the battery upon arrival at the DCFC after preconditioning is complete, as well as other model parameters (e.g., number of loops in heating, number of loops in cooling, number of total loops, etc.). The final predicted temp may help to "debug" the model and reevaluate the accuracy of the model. The predicted preconditioning time is output at process block 217.

After identifying the present SOV (block 209), the target preconditioning temperature (block 211), and the predicted battery preconditioning time (block 215), method 200 executes TIME TO START PRECONDITIONING decision block 219 to determine if preconditioning should be started immediately or delayed to a future start time. To complete this decision, DC FAST CHARGER ETA data input/output block 221 predicts an estimated travel time for the subject vehicle to travel from its current location to the charging station location. Estimated travel times may be derived by resident navigation software from path plan data received, in whole or in part, from a vehicle occupant and/or an ADAS/autonomous control module. By way of non-limiting example, telematics unit 14 may estimate travel time using GPS-borne geolocation data of the vehicle's current location, a driver-selected destination input via touchscreen display 18, and road-level data for a path between origin and destination received from a subscriber-based open street map service.

If the estimated travel time to reach the charging station is greater than the predicted battery preconditioning time, the method 200 may automatically delay the preconditioning of the battery. On the other hand, if the estimated travel time is less than or equal to the predicted battery preconditioning time, the method 200 may immediately start battery preconditioning. For example, if the estimated time to precondition the battery is approximately one hour, but the charging station is approximately 2.25 hours away, the battery system may delay initialization of preconditioning for an hour to an hour and 15 minutes. In contrast, if the charging station is only 30 mins away, preconditioning may be initiated immediately based on existing values; however, preconditioning may be amplified to reach the target battery temperature upon arrival at the charging station.

Method 200 advances from decision block 219 to DOWNSTREAM CONTROL data output block 223 to carry out preconditioning of the battery. By way of example, CPU 36 may transmit one or more control signals to the battery system's internal thermal system to precondition the battery based on the present SOV, target precondition temperature, and predicted battery preconditioning time. EBCM 56 of FIG. 1, for example, may precondition the traction battery pack 70 in advance of charging such as by preheating or precooling the pack 70 while vehicle 10 is en route to a charging location. When charge preconditioning is not being applied to the traction battery pack 70 by the EBCM 56, the target battery temperature may be set to a nominal temp value within a normal operating temperature range. By increasing or decreasing the temperature of the battery pack 70 prior to commencement of a charging operation, charging can occur at a faster rate as compared to the charging rate that would be possible if the vehicle 10 arrived at the charging station after regulating the temperature of the battery pack 70 using the nominal setting.

During battery preconditioning, the method 200 monitors a status of the preconditioning of the battery, as indicated at DCFC PRECONDITIONING STATUS process block 225. As part of this operation, the EBCM 56 may confirm that battery conditioning has commenced, track real-time battery temperature during preconditioning, and assess when conditioning has been completed. During preconditioning, the EBCM 56 may also monitor the battery system for any faults, error events, or requests to disable conditioning; the EBCM 56 may responsively deactivate preconditioning and output an error report to the driver or a third-party service provider. At HMI display block 227, the method outputs battery preconditioning status information to an in-vehicle human-machine interface.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a solid-state drive (SSD) memory, a hard-disk drive (HDD) memory, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms may be described with reference to flowcharts and/or workflow diagrams depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method for operating a battery system of a motor vehicle, the battery system including a battery, a system controller, and a thermal system, the method comprising:
   receiving, via the system controller, a recharge signal indicating a request to schedule a recharge event for the battery of the battery system at a selected battery charging station;
   determining, via the system controller responsive to receipt of the recharge signal, a target preconditioning temperature devised to optimize the recharge event of the battery;
   determining a present state of voltage (SOV) or state of charge (SOC) for the battery at a vehicle location of the motor vehicle;
   estimating a predicted SOV or SOC for the battery upon arrival of the motor vehicle at a charging station location, distinct from the vehicle location, of the battery charging station, the estimating the predicted SOV or SOC including forecasting a predicted SOV or SOC battery expenditure to drive the motor vehicle from the vehicle location to the charging station location;
   estimating a predicted battery preconditioning time to thermally precondition the battery to the target preconditioning temperature using the predicted SOV or SOC; and transmitting, via the system controller to the thermal system, a preconditioning signal to precondition the battery based on the present SOV or SOC, the target preconditioning temperature, and the predicted battery preconditioning time.

2. The method of claim 1, further comprising determining, via the system controller, a power rating and/or a voltage output of the battery charging station, wherein the target preconditioning temperature is determined using the power rating and/or the voltage output of the battery charging station.

3. The method of claim 1, further comprising determining, via the system controller responsive to receipt of the recharge signal, if a system fault exists in the battery system that prevents preconditioning of the battery, wherein estimating the predicted battery preconditioning time is responsive to a determination that the system fault does not exist.

4. The method of claim 3, further comprising determining, via the system controller responsive to receipt of the recharge signal, if a state variable exists in the motor vehicle that prevents the motor vehicle from preconditioning the battery, wherein estimating the predicted battery preconditioning time is responsive to a determination that the state variable does not exist.

5. The method of claim 1, further comprising determining an estimated travel time for the motor vehicle to drive from the vehicle location to the charging station location, wherein preconditioning the battery by the thermal system is further based on the estimated travel time.

6. The method of claim 5, wherein forecasting the SOV or SOC battery expenditure is further based on the estimated travel time to the charging station location, and wherein the predicted SOV or SOC is calculated as a mathematical difference between the present SOV or SOC and the SOV or SOC battery expenditure.

7. The method of claim 5, further comprising:
determining if the estimated travel time is greater than the predicted battery preconditioning time; and
delaying transmitting of the preconditioning signal to the thermal system responsive to a determination that the estimated travel time is greater than the predicted battery preconditioning time.

8. The method of claim 1, wherein estimating the predicted battery preconditioning time includes modeling thermal system behavior of the thermal system and battery operating behavior of the battery during driving from the vehicle location to the charging station location.

9. The method of claim 8, wherein modeling the thermal system behavior and the battery operating behavior includes executing an iterative model and simulation tool as a function of ambient temperature data, past driving behavior data of the motor vehicle, current battery temperature data, the present SOV or SOC, and the predicted SOV or SOC.

10. The method of claim 1, wherein determining the present SOV or SOC includes:
receiving measured voltage data from a voltage sensor operatively attached to the battery; and
executing an SOV modeling algorithm using the measured voltage data to determine the present SOV.

11. The method of claim 1, further comprising:
monitoring a status of the preconditioning of the battery; and
outputting, via the system controller to a human-machine interface (HMI) within the motor vehicle, the status of the preconditioning of the battery.

12. The method of claim 1, wherein the target preconditioning temperature optimizes the recharging of the battery by minimizing a total charge time for the recharge event while minimizing a total system energy expenditure of the battery system to precondition the battery.

13. The method of claim 1, wherein the recharge signal is received from an occupant of the motor vehicle via an in-vehicle user-input device.

14. An electric-drive vehicle, comprising:
a vehicle body;
a plurality of road wheels attached to the vehicle body;
a traction motor attached to the vehicle body and operable to drive one or more of the road wheels to thereby propel the electric-drive vehicle;
a battery system including a thermal system and a traction battery pack both attached to the vehicle body, the traction battery pack containing a plurality of battery cells and operable to power the traction motor; and
an electronic system controller programmed to:
receive a recharge signal indicating a request to schedule a recharge event for the traction battery pack at a selected battery charging station;
responsive to receipt of the recharge signal, determine a target preconditioning temperature devised to optimize the recharge event of the traction battery pack;
determine a present state of voltage (SOV) or state of charge (SOC) for the traction battery pack at a present vehicle location of the electric-drive vehicle;
estimate a predicted SOV or SOC for the traction battery pack upon arrival of the electric-drive vehicle at a charging station location of the battery charging station, including forecasting a predicted SOV or SOC battery expenditure to drive the electric-drive vehicle from the present vehicle location to the charging station location while preconditioning the traction battery pack;
estimate a predicted battery preconditioning time to thermally precondition the traction battery pack to the target preconditioning temperature using the predicted SOV or SOC; and
transmit a preconditioning signal to the thermal system to precondition the traction battery pack based on the present SOV or SOC, the target preconditioning temperature, and the predicted battery preconditioning time.

15. The electric-drive vehicle of claim 14, wherein the system controller is further programmed to determine a power rating and/or a voltage output of the battery charging station, wherein the target preconditioning temperature is determined using the power rating and/or the voltage output of the battery charging station.

16. The electric-drive vehicle of claim 14, wherein the system controller is further programmed to determine if a system fault exists in the battery system and/or a state variable exists for the motor vehicle that prevents preconditioning of the traction battery pack, wherein estimating the predicted battery preconditioning time is responsive to a determination that the system fault does not exist and the state variable does not exist.

17. The electric-drive vehicle of claim 14, wherein the system controller is further programmed to determine an estimated travel time for the motor vehicle to drive from the vehicle location to the charging station location, wherein preconditioning the traction battery pack by the thermal system is further based on the estimated travel time.

18. The electric-drive vehicle of claim 14, wherein estimating the predicted battery preconditioning time includes modeling thermal system behavior of the thermal system and battery operating behavior of the traction battery pack during the drive from the vehicle location to the charging station location.

19. The electric-drive vehicle of claim 14, wherein the target preconditioning temperature optimizes the recharging of the traction battery pack by minimizing a total charge time for the recharge event while minimizing a total system energy of the battery system used to precondition the traction battery pack.

20. A method for operating a battery system of a motor vehicle, the battery system including a battery, a system controller, and a thermal system, the method comprising:

receiving, via the system controller, a recharge signal indicating a request to schedule a recharge event for the battery of the battery system at a selected battery charging station;

determining, via the system controller responsive to receipt of the recharge signal, if a battery system fault exists in the battery system that prevents preconditioning of the battery;

determining, via the system controller responsive to a determination that the battery system fault does not exist, a present battery temperature and a present state of voltage (SOV) or state of charge (SOC) for the battery at a vehicle location of the motor vehicle;

determining, via the system controller based on the present battery temperature and the present SOV or SOC, a target preconditioning temperature devised to optimize the recharge event of the battery;

estimating a predicted SOV or SOC for the battery upon arrival of the motor vehicle at a charging station location, distinct from the vehicle location, of the battery charging station;

estimating a predicted battery preconditioning time to thermally precondition the battery to the target preconditioning temperature using the predicted SOV or SOC; and transmitting, via the system controller to the thermal system, a preconditioning signal to precondition the battery based on the present SOV or SOC, the target preconditioning temperature, and the predicted battery preconditioning time.

\* \* \* \* \*